(12) United States Patent
Jensen et al.

(10) Patent No.: US 7,438,224 B1
(45) Date of Patent: Oct. 21, 2008

(54) TRANSACTION CARD WITH STAKE

(75) Inventors: Stacy M. Jensen, Burns Township, MN (US); Paul W. Boge, Mora, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 11/697,276

(22) Filed: Apr. 5, 2007

(51) Int. Cl.
*G06K 5/00* (2006.01)
*G06K 19/00* (2006.01)
*G06K 19/06* (2006.01)
*G06Q 40/00* (2006.01)
*G07D 11/00* (2006.01)
*G07F 19/00* (2006.01)

(52) U.S. Cl. .............. 235/380; 235/487; 235/492; 235/493; 235/379

(58) Field of Classification Search ............... 235/379, 235/380, 487, 492, 493; 283/74, 75, 81, 283/82, 117, 904, 57; 40/124.01, 645
See application file for complete search history.

(56) References Cited

U.S. PATENT DOCUMENTS

| | | | | | |
|---|---|---|---|---|---|
| 2,294,567 | A | * | 9/1942 | Mooney | 206/216 |
| 2,461,054 | A | * | 2/1949 | Green | 40/645 |
| 3,098,320 | A | * | 7/1963 | Estkowski | 47/56 |
| 3,643,795 | A | * | 2/1972 | Watwood et al. | 206/756 |
| 3,908,308 | A | * | 9/1975 | Meyers | 47/56 |
| 4,132,329 | A | * | 1/1979 | Harrison | 221/45 |
| 4,168,002 | A | * | 9/1979 | Crosby | 206/459.5 |
| 4,353,183 | A | * | 10/1982 | Estkowski | 47/56 |
| 4,418,497 | A | * | 12/1983 | Mastriano | 47/67 |
| D297,334 | S | | 8/1988 | Trent | |
| D309,473 | S | | 7/1990 | Toy | |
| 5,001,860 | A | * | 3/1991 | Rudnick | 47/69 |

(Continued)

FOREIGN PATENT DOCUMENTS

FR 2584983 A1 * 1/1987

(Continued)

OTHER PUBLICATIONS

Original Touch Sweet Pea. www.originaltouch.co.uk/acatalog/Sweet_Pea.html, 2008.*

(Continued)

*Primary Examiner*—Daniel Walsh
(74) *Attorney, Agent, or Firm*—Ingrassia Fisher & Lorenz, P.C.

(57) ABSTRACT

A financial transaction card is associated with seeds of at least one type, where each of the seeds is configured for planting in a composition. The financial transaction card includes a substrate defining a first portion and a second portion attached to and readily separable from the first portion. The first portion includes an account identifier, which links the financial transaction card to at least one of a financial account and a financial record and is machine readable by a point-of-sale terminal. The second portion includes a pointed end and indicia identifying the at least one type of seeds. The second portion is configured for insertion into the composition to mark where the seeds are planted in the composition. Stored-value card assemblies, methods of encouraging purchase and facilitating use of a stored-value card, and other embodiments are also disclosed.

23 Claims, 8 Drawing Sheets

U.S. PATENT DOCUMENTS

| | | | |
|---|---|---|---|
| 5,158,809 A * | 10/1992 | Proctor | 428/23 |
| D332,113 S | 12/1992 | Yates | |
| 5,210,975 A * | 5/1993 | Beckerman | 47/56 |
| 5,323,553 A | 6/1994 | Candido | |
| D370,499 S | 6/1996 | Bechler et al. | |
| 5,570,081 A | 10/1996 | Holstrom | |
| 5,575,384 A * | 11/1996 | Saye | 206/232 |
| 5,720,129 A * | 2/1998 | Lantinberg | 47/56 |
| D394,454 S | 5/1998 | Williams et al. | |
| 5,840,355 A * | 11/1998 | Prescott et al. | 426/104 |
| 6,096,431 A * | 8/2000 | Matsudaira et al. | 428/423.7 |
| D432,174 S | 10/2000 | Stevens et al. | |
| D432,176 S | 10/2000 | Stevens et al. | |
| 6,269,158 B1 | 7/2001 | Kim | |
| 6,338,211 B1 * | 1/2002 | Carney | 40/124.5 |
| D453,336 S | 2/2002 | Pentz et al. | |
| D453,338 S | 2/2002 | Pentz et al. | |
| 6,350,530 B1 | 2/2002 | Morikawa et al. | |
| D454,910 S | 3/2002 | Smith et al. | |
| 6,355,285 B1 * | 3/2002 | Hoy | 426/87 |
| 6,372,331 B1 | 4/2002 | Terada et al. | |
| D458,633 S | 6/2002 | Nada et al. | |
| 6,588,658 B1 * | 7/2003 | Blank | 235/380 |
| D481,067 S | 10/2003 | Haas | |
| 6,655,868 B2 | 12/2003 | Drew | |
| 6,684,561 B2 * | 2/2004 | Poret et al. | 47/73 |
| D487,907 S | 3/2004 | Kumakura | |
| D490,103 S | 5/2004 | Rangel et al. | |
| D493,492 S | 7/2004 | Best et al. | |
| D493,840 S | 8/2004 | Best et al. | |
| D501,875 S | 2/2005 | Dean | |
| D504,159 S | 4/2005 | Best et al. | |
| D512,456 S | 12/2005 | Diaz et al. | |
| 7,024,807 B2 | 4/2006 | Street | |
| 7,032,817 B2 | 4/2006 | Blank | |
| 7,065,195 B1 | 6/2006 | Smith et al. | |
| D524,858 S | 7/2006 | Graves et al. | |
| D531,755 S | 11/2006 | Taylor | |
| D533,220 S | 12/2006 | Graves et al. | |
| 7,275,683 B2 * | 10/2007 | Lazarowicz et al. | 235/375 |
| D561,252 S | 2/2008 | Phillips et al. | |
| 2002/0000064 A1 * | 1/2002 | D'Agnone et al. | 47/1.01 R |
| 2002/0040670 A1 * | 4/2002 | Hornak | 111/114 |
| 2003/0014891 A1 * | 1/2003 | Nelms et al. | 40/649 |
| 2003/0029068 A1 * | 2/2003 | Weber | 40/645 |
| 2004/0249748 A1 | 12/2004 | Schultz et al. | |
| 2005/0044764 A1 * | 3/2005 | Decker | 40/645 |
| 2006/0107561 A1 * | 5/2006 | Menzie et al. | 40/124.01 |
| 2006/0231609 A1 * | 10/2006 | Lazarowicz et al. | 235/380 |
| 2007/0246548 A1 | 10/2007 | Schultz et al. | |

FOREIGN PATENT DOCUMENTS

| | | | |
|---|---|---|---|
| FR | 2707832 | | 1/1995 |
| FR | 2795019 A1 | * | 12/2000 |
| JP | 02227296 A | * | 9/1990 |
| WO | 9416907 | | 8/1994 |

OTHER PUBLICATIONS

Photographs of a gift card product offered for sale in Target stores more than one year prior to Apr. 5, 2007 (3 pages).

"Travel Tags Offers Earth-Friendly Nattera Card," www.traveltags.com, Nov. 21, 2006.

"Ecofit Card," www.dnp.co.jp/international/card/ec.html, printed on Jun. 22, 2006.

"Seeded Paper Card," www.4imprint.com/EXEC/DETAIL/RECOMMENDED/~SKU005244/~CA5244.htm, printed on Jun. 22, 2006.

"Grow-A-Note Greeting Cards," www.greenfieldpaper.com/asc-custompages/products.asp?fpage=1&productID=3&categoryid=3, printed on Jun. 22, 2006.

"Card With Germinating Elements," English Abstract of French Publication No. FR2707832, Published Jan. 27, 1995.

* cited by examiner

TRANSACTION CARD WITH STAKE

BACKGROUND OF THE INVENTION

Stored-value cards and financial transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a financial transaction card associated with seeds of at least one type, where each of the seeds is configured for planting in a planting composition. The financial transaction card includes a substrate defining a first portion and a second portion attached to and readily separable from the first portion. The first portion includes an account identifier, which links the financial transaction card to at least one of a financial account and a financial record and is machine readable by a point-of-sale terminal. The second portion includes a pointed end and indicia identifying the at least one type of seeds. The second portion is configured for insertion into the planting composition to mark where the seeds are planted in the planting composition. Methods of encouraging purchase and facilitating use of a stored-value card, and other embodiments of stored-value or financial transaction cards and associated assemblies are also disclosed.

BRIEF DESCRIPTION OF THE DRAWINGS

Embodiments of the invention will be described with respect to the figures, in which like reference numerals denote like elements, and in which.

DETAILED DESCRIPTION

A stored-value card or other financial transaction product is adapted for making purchases of goods and/or services at, for example, a retail store or website. According to one embodiment, an original consumer buys a stored-value card to give a recipient who in turn is able to use the stored-value card at a retail store or setting to pay for goods and/or services. In one embodiment, the stored-value card provides for prepaid calling minutes, points, or other non-monetary measure of value such that the minutes or points in an account associated with stored-value card can be applied toward a telephone call, purchase, etc. A stored-value card, according to embodiments of the present invention, provides the consumer and recipient with an auxiliary use in addition to the ability to pay for goods and/or services or to accessing calling minutes, points, etc. with the stored-value card.

In particular, the stored-value card includes at least a first portion separable from the second portion. In one embodiment, the second portion is separable from the first portion and is configured for use as a stake or other marking member that can, for example, be placed in soil or other planting composition to mark where a flower or other plant was planted. The first portion includes the an identifier or other device to function as the stored-value portion of the card. As such, even after separation of the first portion from the second portion, the first portion can be used as tender toward the purchase of one or more of goods and services. In one embodiment, this dual functional aspect (e.g., for use toward purchases and use as a stake) of the stored-value card promotes the sale, use, and/or loading of the stored-value card by potential consumers and/or bearers of the stored-value card.

To further enhance the dual functionality of the stored-value card, in one embodiment, the stored-value card is selectively attached to a backer or carrier for support wherein the backer is formed of a substantially biodegradable material and is embedded with seeds for one or more flower types or other suitable plant types. With this construction in mind, the stored-value card can be removed from the backer, the backer can be planted in a planting composition, and the second portion of the stored-value card positioned in the planting composition to mark where the backer was planted for future reference. In one embodiment, the stored-value card may also be formed of a biodegradable material and/or may also be embedded with seeds for planting.

Turning to the figures, FIGS. 1-7 illustrate various views of one embodiment of a stored-value card or product 10 formed of a substrate 12, which is any suitable material such as a somewhat rigid yet flexible material similar to that commonly used for identification cards, credit cards, etc. More specifically, in one embodiment, substrate 12 is formed of paper, cardstock, plastic, e.g. polycarbonate, polystyrene, or polyvinyl chloride (PVC), or other suitable material. In one embodiment, substrate 12 is formed of injected molded plastic or cut from sheet-stock plastic material. Substrate 12 can be formed in any other suitable planar or non-planar configuration as will be apparent to those of skill in the art upon reading this application. In one embodiment, substrate 12 is biodegradable, for example, is formed of a corn-based, rape seed-based or soybean-based plastic material, paper-based material, or other suitable biodegradable material, or is otherwise formed in an environmentally friendly manner to reduce fossil-fuel consumption, greenhouse gasses, and to be commercially compostable (e.g., polyethylene terephthalate glycol (PET-G), etc.).

Substrate 12 defines a first surface 20 and a second surface 22 opposite first surface 20. In one embodiment, at least one of first and second surfaces 20 and 22 is substantially planar. Substrate 12 defines a first section or portion 24 and a second section or portion 26. In one example, first portion 24 is formed with a substantially rectangular shape while second portion 26 is formed with a substantially rectangular shape except for a pointed end 28 configured to facilitate placement of second portion 26 into a planting composition as will be further described below.

In one embodiment, substrate 12 is perforated, scored, or otherwise weakened along a separation line 30 defined between first portion 24 and second portion 26 to provide for relatively easy separation of first portion 24 from second portion 26. In one example, first portion 24 and second portion 26 are separable from each other without the use of tools, such as by snapping, bending, and/or tearing first portion 24 from second portion 26. Although, primarily described as being formed of a single piece substrate 12, in one embodiment, first portion 24 is separately formed from and connected or otherwise attached to second portion 26. Further, in view of the above-described construction, in one embodiment, first portion 24 is considered an account access portion, and second portion 26 is considered a stake portion of stored-value card 10.

Figure 1:
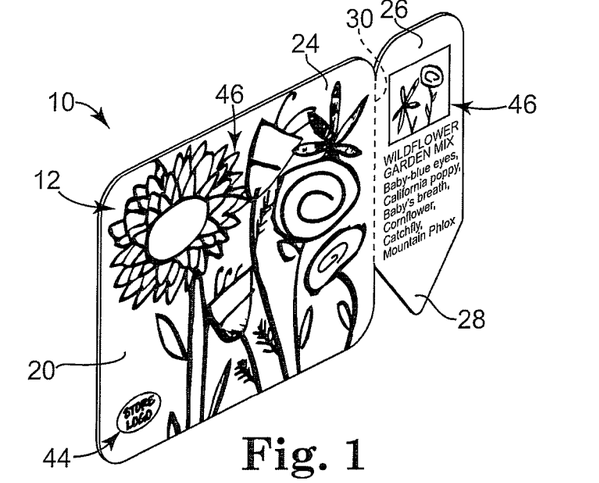
FIG. 1 is a perspective view illustration of a stored-value card, according to one embodiment of the present invention.

In one embodiment, stored-value card 10 as a whole is similarly sized to an identification card, a credit card, or other card sized to fit in a wallet of a card bearer (i.e. is wallet sized). In particular, in one embodiment, the overall dimensions of substrate 12 are about 8.5 cm by about 5.5 cm wide with a thickness of less than about 1 mm. In other embodiments, substrate 12 is otherwise shaped as a square, circle, oval, star, or any other suitable shape. In one embodiment, first portion 24 alone is similarly sized to an identification card, a credit card, or other card sized to fit in a wallet of a card bearer (i.e. is wallet sized).

Figure 2:
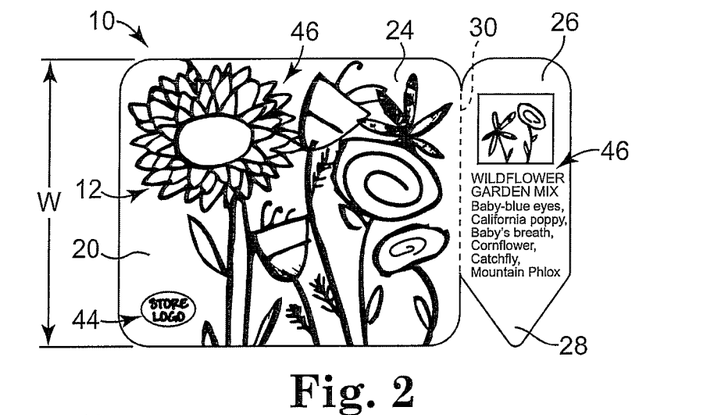
FIG. 2 is a front view illustration of the stored-value card of FIG. 1.

First portion 24 and second portion 26 may be associated with or positioned relative to each other in any suitable manner. For example, as illustrated in FIGS. 1-7, first portion 24 and second portion 26 are positioned in a side-by-side manner such that each of first portion 24 and second portion 26 have a similar overall width W (FIG. 2). However, in one example, as illustrated with respect to stored-value card 10' in FIG. 8, first portion 24' and second portion 26' are positioned in a stacked manner such that each of first portion 24' and second portion 26' have a similar overall length L. Other configurations are also contemplated and will be apparent to those of skill in the art upon reading this application.

Figure 3:
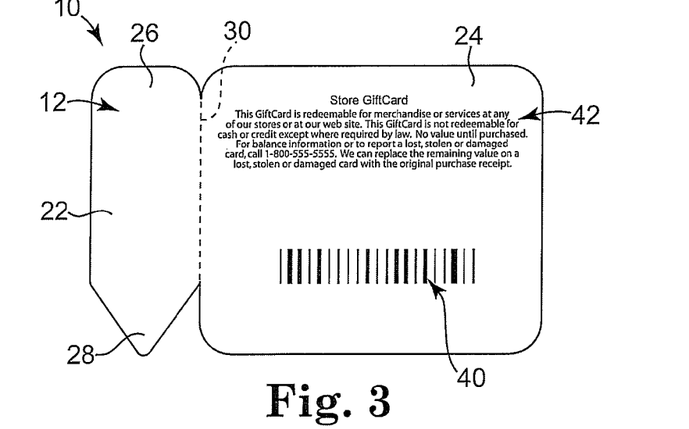
FIG. 3 is a rear view illustration of the stored-value card of FIG. 1.
Figure 4:
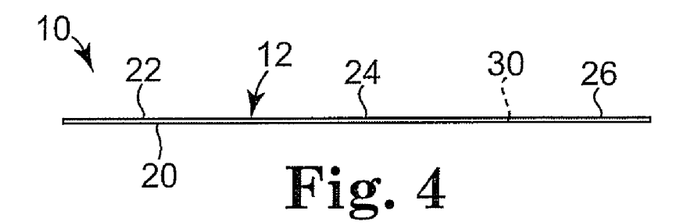
FIG. 4 is a top view illustration of the stored-value card of FIG. 1.
Figure 5:
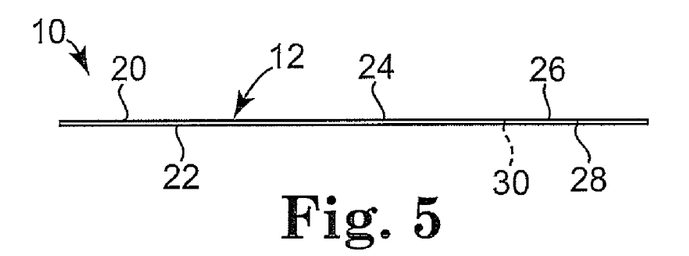
FIG. 5 is a bottom view illustration of the stored-value card of FIG. 1.
Figure 6:
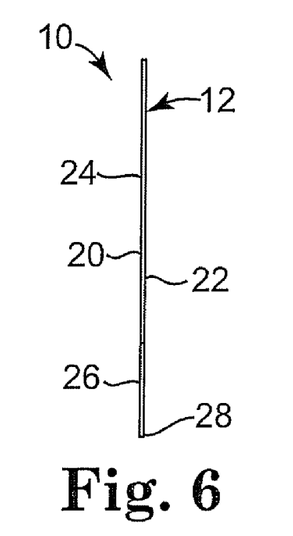
FIG. 6 is a right side view illustration of the stored-value card of FIG. 1.
Figure 7:
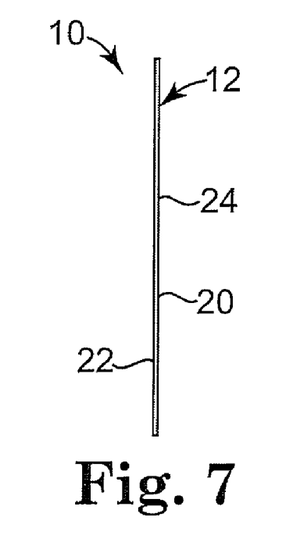
FIG. 7 is a left side view illustration of the stored-value card of FIG. 1.

Referring to the rear view illustration of FIG. 3, stored-value card 10, for example, second surface 22 of substrate 12, includes an account identifier 40, such as a bar code, a magnetic strip, a smart chip or other electronic device, a radio frequency identification (RFID) device, or other suitable identifier readily readable by a point-of-sale terminal, account access station, kiosk, or other suitable device. More particularly, in one embodiment, account identifier 40 is printed on or otherwise applied to second surface 22 of substrate 12 and is solely included on first portion 24. Account identifier 40 indicates a financial or other stored-value account or record to which stored-value card 10 is linked. The account or record of the monetary, point, minutes, or other balance on stored-value card 10 optionally is maintained on a database, other electronic or manual record-keeping system, or, in the case of "smart" cards for example, on a chip or other electronic device on/in stored-value card 10 itself. Accordingly, by scanning account identifier 40, the account or record linked to stored-value card 10 is identified and can subsequently be activated, have amounts debited therefrom, and/or have amounts credited thereto. First portion 24, or any other portion of stored-value card 10, that includes account identifier 40 is one example of means for linking stored-value card 10 with an account or record.

In one embodiment, redemption indicia 42 are included on stored-value card 10 such as on second surface 22 of substrate 12. Redemption indicia 42 indicate that stored-value card 10 is redeemable for the purchase of goods and/or services and that, upon use, a value of the purchased goods and/or services will be deducted from the account or record linked to stored-value card 10. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc.

In one embodiment, stored-value card 10 includes other indicia 44 disposed on stored-value card 10 such as, for example, brand indicia which is one example of means for associating stored-value card 10 with at least one of a product, a brand, a store, a holiday, a season, an occasion, a media format, e.g. characters, logos, scenes, or other illustrations or photographs related to at least one of a movie, television show, book, video game, etc. In one example, substrate 12, more specifically, first surface 20 of substrate 12, includes graphical indicia 46 corresponding with the plantable nature of stored-value card 10 and/or backer 70 associated therewith. For example, graphical indicia 46 may include a depiction flowers, plants, etc. similar to those of an associated backer 70 as will be further described below. In one embodiment, graphical indicia 46 alternatively or additionally include a listing of the flowers or plants associated with backer 70 and/or stored-value card 10 on second portion 26, and therefore, in one example, serve as a seed identifier. One example of means for identifying at least one type of the one or more seeds 50 or 78 (e.g., FIGS. 8-11) is second portion 26 with graphical indicia 46.

Other indicia or additional features may also be included on stored-value card 10 as will be apparent to those of skill in the art upon reading this application. In one example, any one or more of indicia 42, 44, and 46 may not be included on stored-value card 10. In one embodiment, account identifier 40, indicia 42, indicia 44 and/or indicia 46 are printed to stored-value card 10 with soy-based or other ink configured to reduce fossil-fuel consumption and greenhouse gases, thereby, contributing to the environmentally friendly nature of stored-value card 10.

Figure 8:
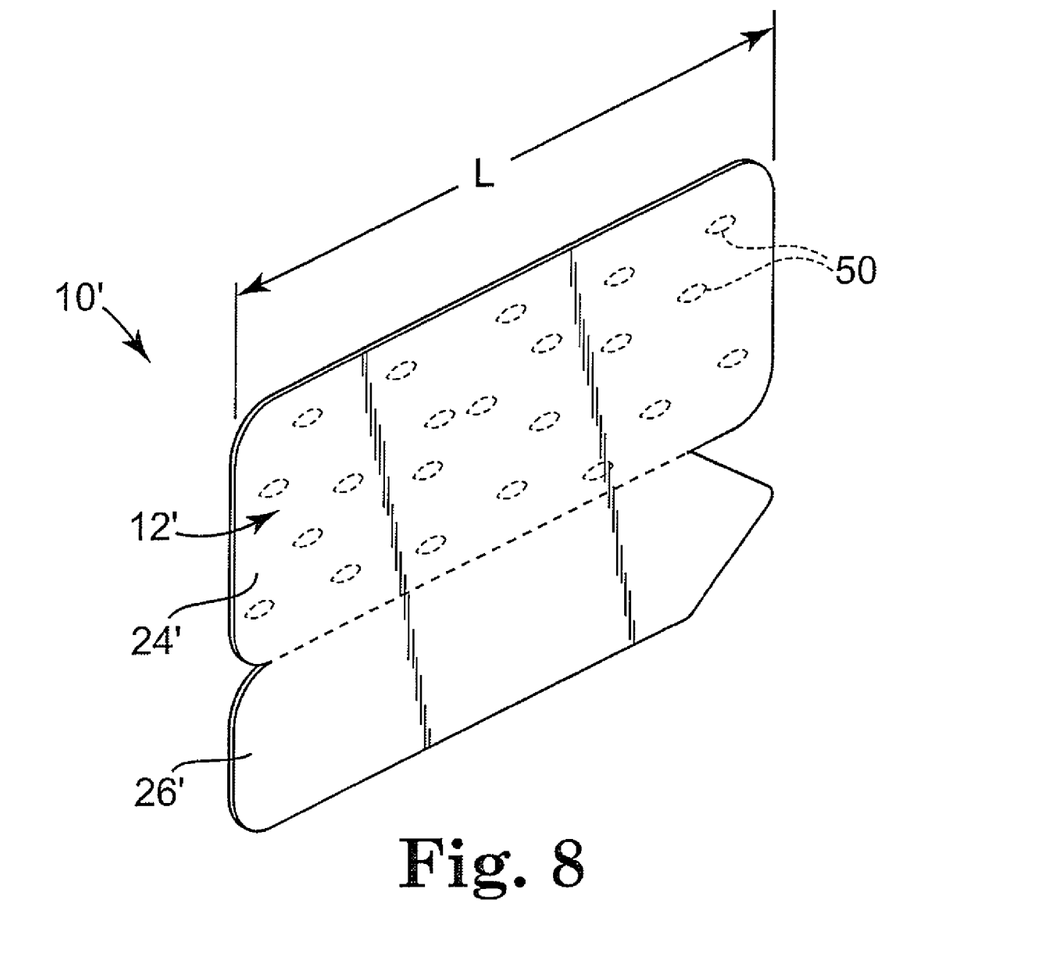
FIG. 8 is a perspective view illustration of a stored-value card, according to one embodiment of the present invention.
Figure 11:
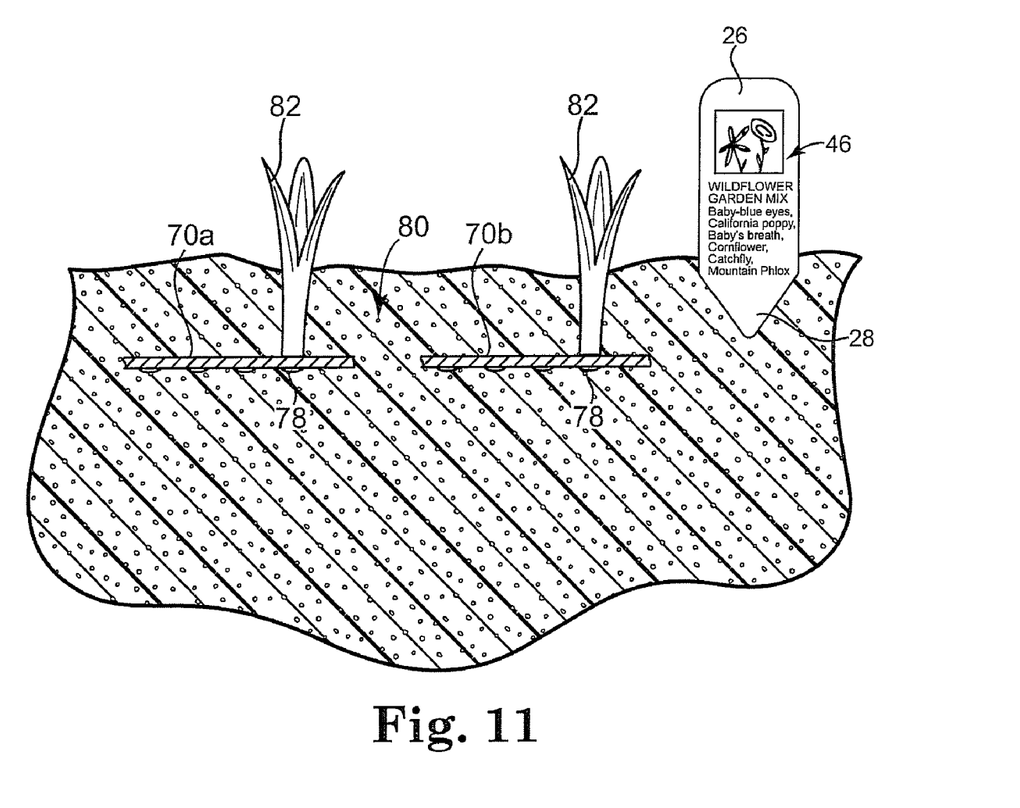
FIG. 11 is a front cross-sectional view illustration of a planting including the backer of FIGS. 9 and 10 and a portion of the stored-value card of FIG. 1, according to one embodiment of the present invention.

FIG. 8 illustrates another embodiment of a stored-value card as generally indicated at 10'. Stored-value card 10' is similar to stored-value card 10 of FIGS. 1-7 except where specifically described herein. In one example, stored-value card 10' is formed of a substrate 12', which is similar to substrate 12 described above, that is biodegradable and embedded with one or more seeds 50 (e.g., a plurality of seeds) in one or more of first and second portions 24' and 26'. In this manner, stored-value card 10' itself is configured to be planted in planting composition 80 (FIG. 11). It should be noted that while stored-value card 10' is illustrated with the plurality of seeds 50, in one embodiment, stored-value card 10 is similarly embedded with a plurality of seeds (not shown). Other characteristics of stored-value card 10 and stored-value card 10' can be supplemented and/or interchanged with each other was will be apparent to those of skill in the art upon reading this application.

Figure 9:
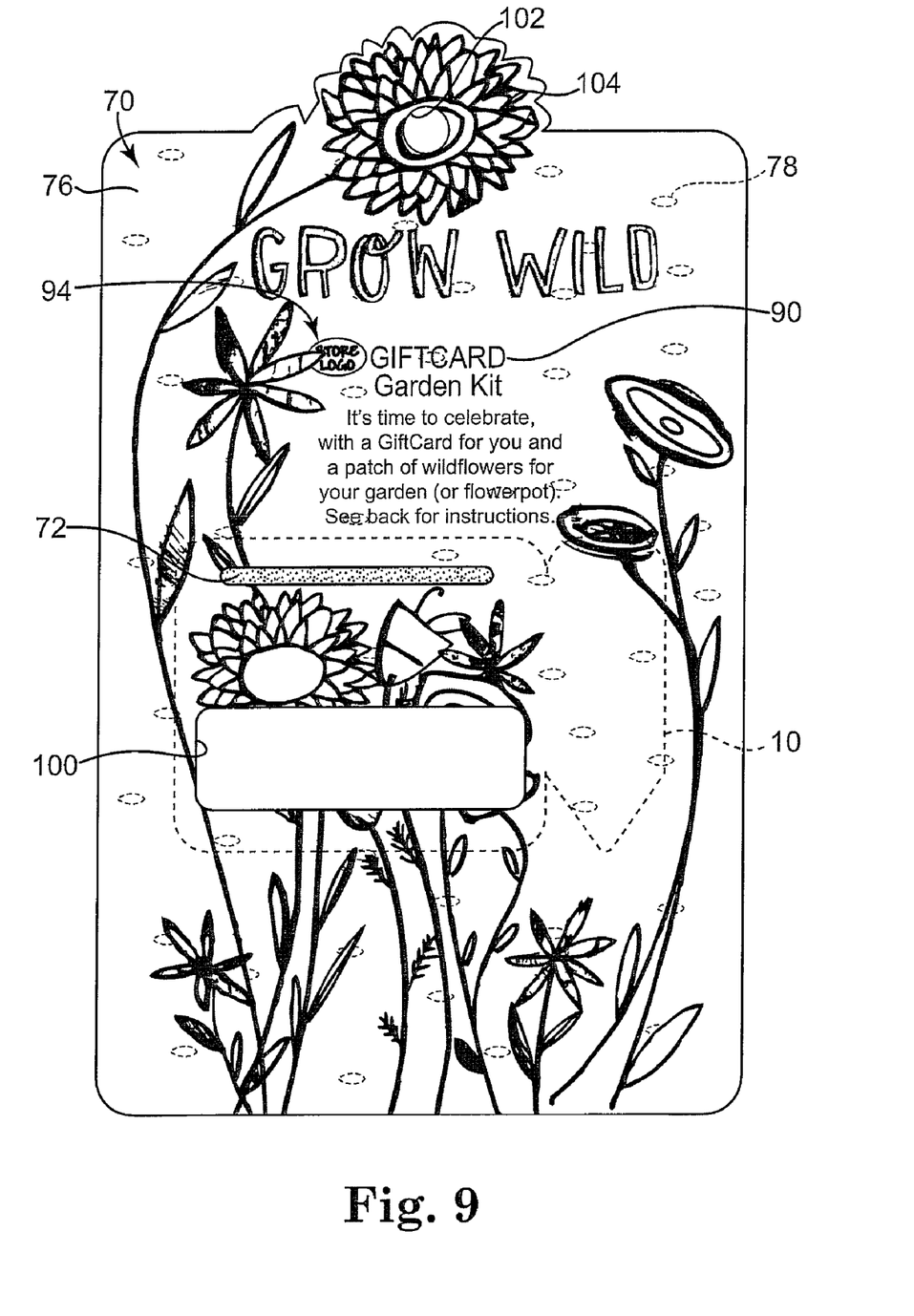
FIG. 9 is a front view illustration of a backer for a stored-value card, according to one embodiment of the present invention.
Figure 10:
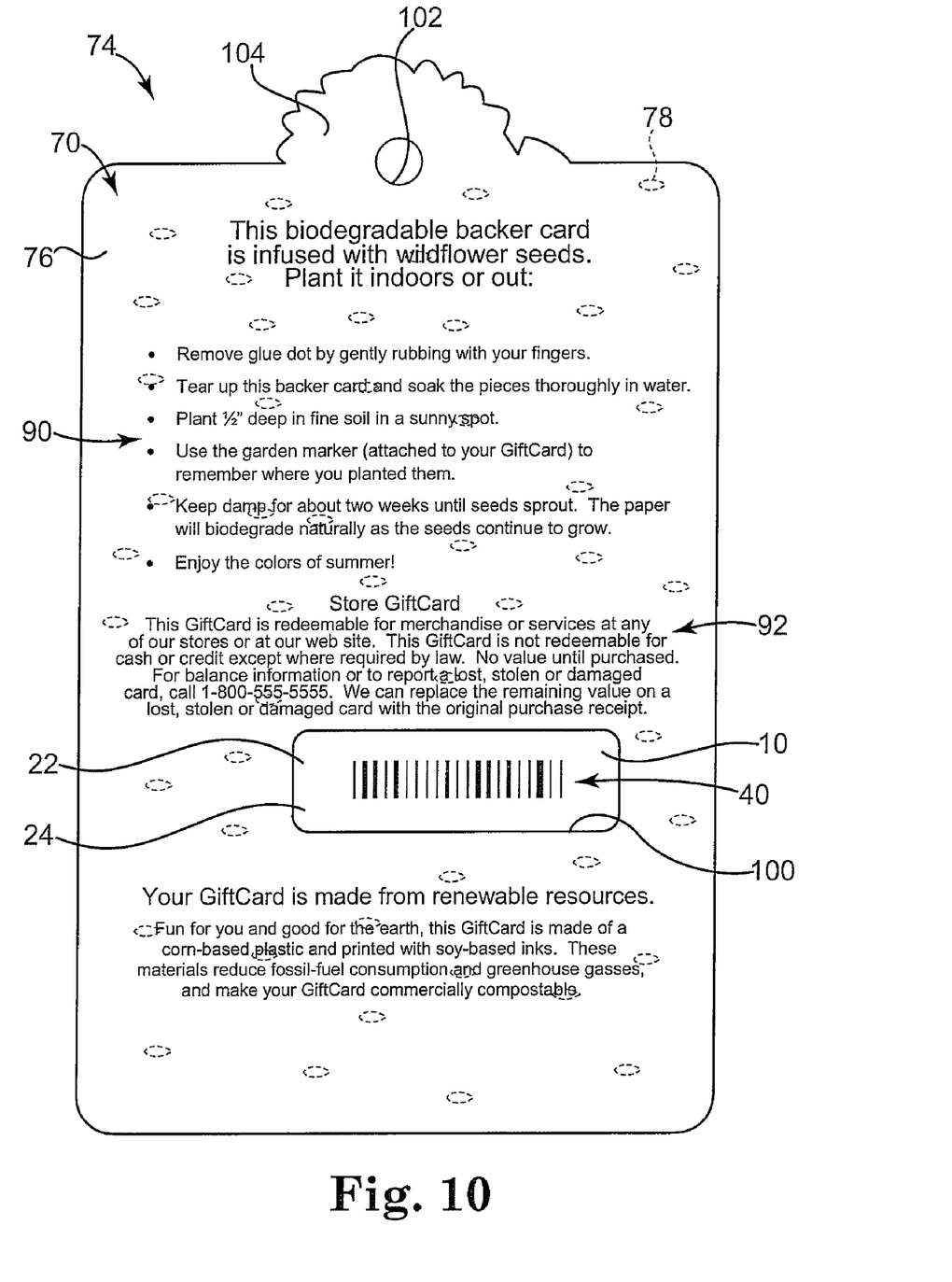
FIG. 10 is a rear view illustration of a stored-value card assembly including the backer of FIG. 9 and the stored-value card of FIG. 1, according to one embodiment of the present invention.

FIGS. 9 and 10 illustrate a carrier or backer 70 for supporting stored-value card 10. Stored-value card 10, which is represented in phantom lines in FIG. 9 for illustrative purposes so as to not obstruct backer 70, is readily releasably attached to backer 70, for example by a removable adhesive 72 or the like. Backer 70 and stored-value card 10 collectively define a stored-value card assembly or stored-value product assembly 74 (FIG. 10). Notably, while backer 70 is primarily described with respect to stored-value card 10, in one embodiment, backer 70 is similarly configured for use with stored-value card 10' to collectively form a similar stored-value card assembly as will be apparent to those of skill in the art upon reading this application.

In one embodiment, backer 70 comprises a single layer or multiple layers of paper or plastic material 76, for example, generally in the form of a relatively stiff but bendable/flexible card. In one embodiment, material 76 is substantially biodegradable (e.g., is a corn-based material such as a polylactic acid (PLA) matte corn material, rape seed-based material, soybean-based material, or other suitable material) and is formed with one or more seeds 78 (e.g., a plurality of seeds 78) embedded therein. In one example, material 76 is fibrous and is water soluble, which allows material 76 to securely contain the one or more seeds 78 between its fibers and to facilitate growth of the one or more seeds 78 by degrading or disintegrating after planting. More specifically, backer 70 is configured for planting within a planting composition 80, as generally illustrated with additional reference to FIG. 11, such that material 76 degrades within planting composition 80 releasing the one or more seeds 78 or otherwise allowing the one or more seeds 78 to sprout and grow as generally indicated as sprouts or plants 82. As a result, the one or more seeds 78 grow within planting composition 80 in a manner similar to seeds planted directly into planting composition 80 without material 76. The one or more seeds 78 may be of any suitable type such as vegetable seeds, flower seeds, etc. In one embodiment, all of the one or more seeds 78 are of a single type and are related to a single type of flower, vegetable, or other plant 82. In one example, the one or more seeds 78 provides seeds for growing a mix of wildflowers or other plants 82.

In one embodiment, backer 70 displays indicia, graphics or text information including store logo(s), store name(s), slogans, advertising, instructions, directions, brand indicia, promotional information, holiday indicia, seasonal indicia, media format identifiers, characters, to, from, amount, and message fields, and/or other information. In one example, indicia 90 promote that stored-value card assembly 74 serves as a garden kit including plantable backer 70 and second portion 26 of stored-value card 10, which functions a marking stake. In one example, indicia 90 additionally instruct the bearer of stored-value card assembly 74 on how to plant seeds 78 and mark their planting with second portion 26.

More specifically, in one embodiment, indicia 90 indicate that stored-value card 10 should be removed from backer 70 and adhesive 72 removed from each of the backer 70 and stored-value card 10 by rubbing adhesive 72 with one's fingers. In one example, indicia 90 further indicate that backer 70 be torn into pieces, soaked thoroughly in water, and planted (e.g., 0.5 inches deep) in planting composition 80. Indicia 90 may further indicate that second portion 26 of stored-value card 10 may be used to mark where backer 70 was planted, instruct the user to keep the planting composition 80 damp for about two weeks until seeds 78 sprout, and/or to enjoy the colors of the flowers, which will subsequently grow from seeds 78. Other instruction indicia 90 may additionally or alternatively be included on one or both of backer 70 and stored-value card 10.

Referring to FIG. 10, in one embodiment, indicia 92 indicate that stored-value card 10 or, more particularly, first portion 24 of stored-value card 10, is redeemable for the purchase of goods and/or services and that upon use, a value of the purchased goods and/or services will be deducted from the account or record linked to stored-value card 10. In one embodiment, indicia 92 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc.

Brand indicia 94 (FIG. 9) may also or alternatively be included to identify a store, brand, department, etc. and/or services associated with stored-value card 10. Any of indicia 42, 44, 46 (e.g., FIGS. 2 and 3), 90, 92, 94 (e.g., FIGS. 9 and 10), or other indicia optionally may appear anywhere on backer 70 or stored-value card 10. Additional information besides that specifically described and illustrated herein may also be included and/or one or more of indicia 42, 44, 46, 90, 92, 94 may be eliminated. In one example, indicia 90, 92, and 94, or other indicia on backer 70 are printed thereto with soy-based ink or other ink configured to reduce fossil-fuel consumption and greenhouse gases, thereby, contributing to the environmentally friendly nature of stored-value card assembly 74.

In one embodiment, backer 70 includes a window or opening 100 for displaying account identifier 40 of stored-value card 10 therethrough as illustrated in FIG. 10. As previously described, account identifier 40 is adapted for accessing a financial or other stored-value account or a record associated with stored-value card 10 for activating, loading, or debiting from the account or record. Accordingly, opening 100 allows viewing or other access to account identifier 40 to activate and/or load stored-value card 10, more particularly, first portion 24 of stored-value card 10, without removing stored-value card 10 from backer 70. In one embodiment, a portion of backer 70 alternatively is configured to be folded away from the remainder of backer 70 to access account identifier 40 without removing stored-value card 10 from backer 70.

In one embodiment, backer 70 includes a hanging aperture 102 or similar feature configured to receive a hook or other display member to hang backer 70 therefrom. In one example, hanging aperture 102 is substantially transversely centered on backer 70 and is positioned near a top end 104 thereof. Although as primarily described herein backer 70 is a planar substrate, in one embodiment, backer 70 may include fold lines or otherwise be configured to substantially wrap or enclose stored-value card 10 as will be apparent to those of skill in the art upon reading the present application. Backer 70 is one example of means for supporting stored-value card 10 for display in a retail setting.

Figure 12:
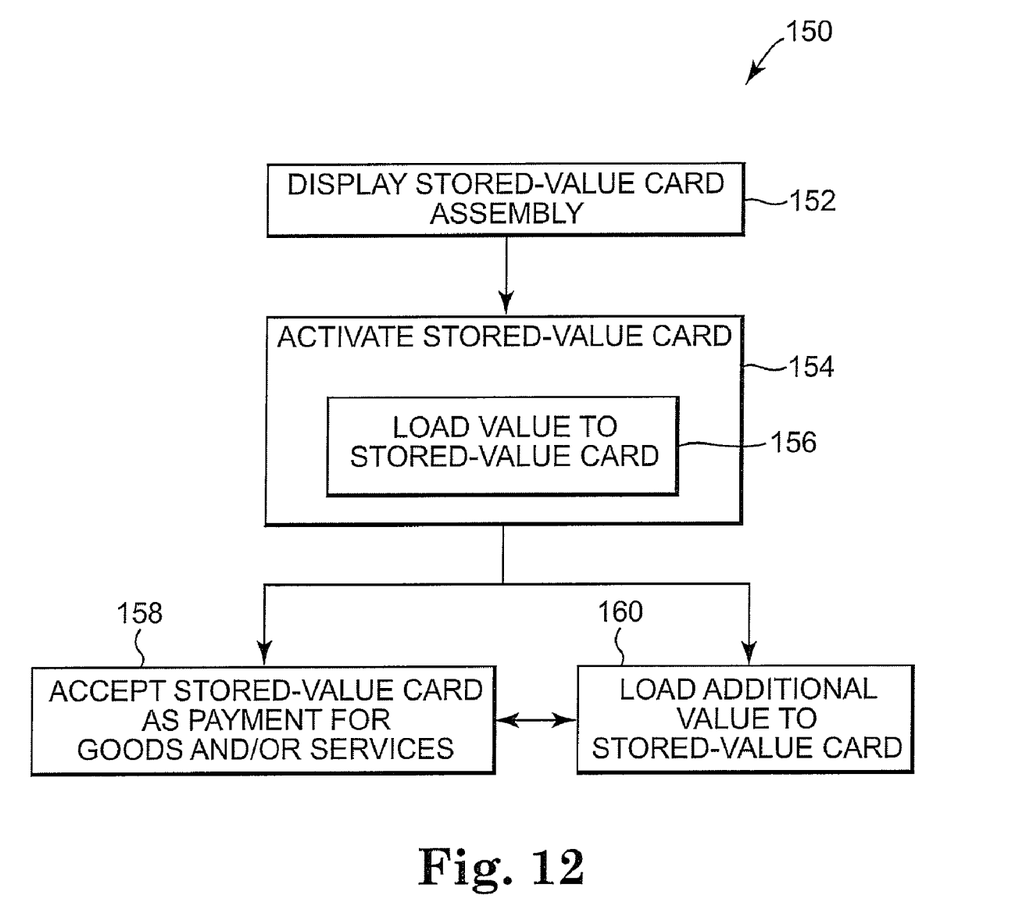
FIG. 12 is a flow chart illustrating a method of encouraging purchase and facilitating use of a stored-value card assembly, according to one embodiment the present invention.

FIG. 12 is a flow chart illustrating one embodiment of a method 150 of encouraging purchase and facilitating use of stored-value card assembly 74 by consumers and/or recipients. At 152, stored-value card assembly 74 is placed or hung from a rack, shelf, or other similar device to display stored-value card 10 for sale to potential consumers. For example, hanging aperture 102 may be placed around a corresponding arm of a display system in a retail setting to hang backer 70 therefrom. In one embodiment, a depiction of stored-value card 10 is placed on a website for viewing and purchase by potential consumers.

At 154, a consumer who has decided to purchase stored-value card 10 presents the stored-value card 10 on backer 70 to a retail store employee, retail store kiosk, remote terminal, or other person or device to scan account identifier 40 to access an account or record linked to account identifier 40. In particular, account identifier 40 is scanned or otherwise accessed, for example through window 100 of backer 70 to activate stored-value card 10. Upon accessing the account or record, then, at 156, value is added to the account or record in the form of monetary value, points, minutes, etc. Thus, stored-value card 10 is activated and loaded.

Once stored-value card 10 is activated and loaded, stored-value card 10 can be used by the consumer or any other bearer of stored-value card 10 to purchase goods and/or services at the affiliated retail setting (e.g., a retail store or website) or can be used in exchange for calling minutes, etc. In one embodiment, where stored-value card 10 is displayed on a website at 152, then, at 154, stored-value card 10 may be activated in any suitable method and may not require the physical scanning of account identifier 40 to be activated or to otherwise access the associated account or record such as at 156.

In one example, at 158, the retail store or other affiliated retail setting or website accepts stored-value card 10 as payment towards the purchase of goods and/or services made by the current bearer of stored-value card 10. In particular, the value currently loaded on stored-value card 10 (i.e. stored or recorded in the account or record linked to account identifier 40) is applied toward the purchase of goods and/or services. At 160, additional value is optionally loaded on stored-value card 10 at a point of sale terminal, kiosk, or other area of the retail store or related setting. Upon accepting stored-value card 10 as payment at 158, the retail store or related setting can subsequently perform either operation 158 or operation 160 as requested by a current bearer of stored-value card 10. Similarly, upon loading additional value on stored-value card 10 at 160, the retail store or related setting can subsequently perform either operation 160 again or operation 158. In one example, the ability to accept stored-value card 10 as payments for goods and/or services is limited by whether the account or record associated with stored-value card 10 has any value stored or recorded therein at the time of attempted redemption.

Figure 13:
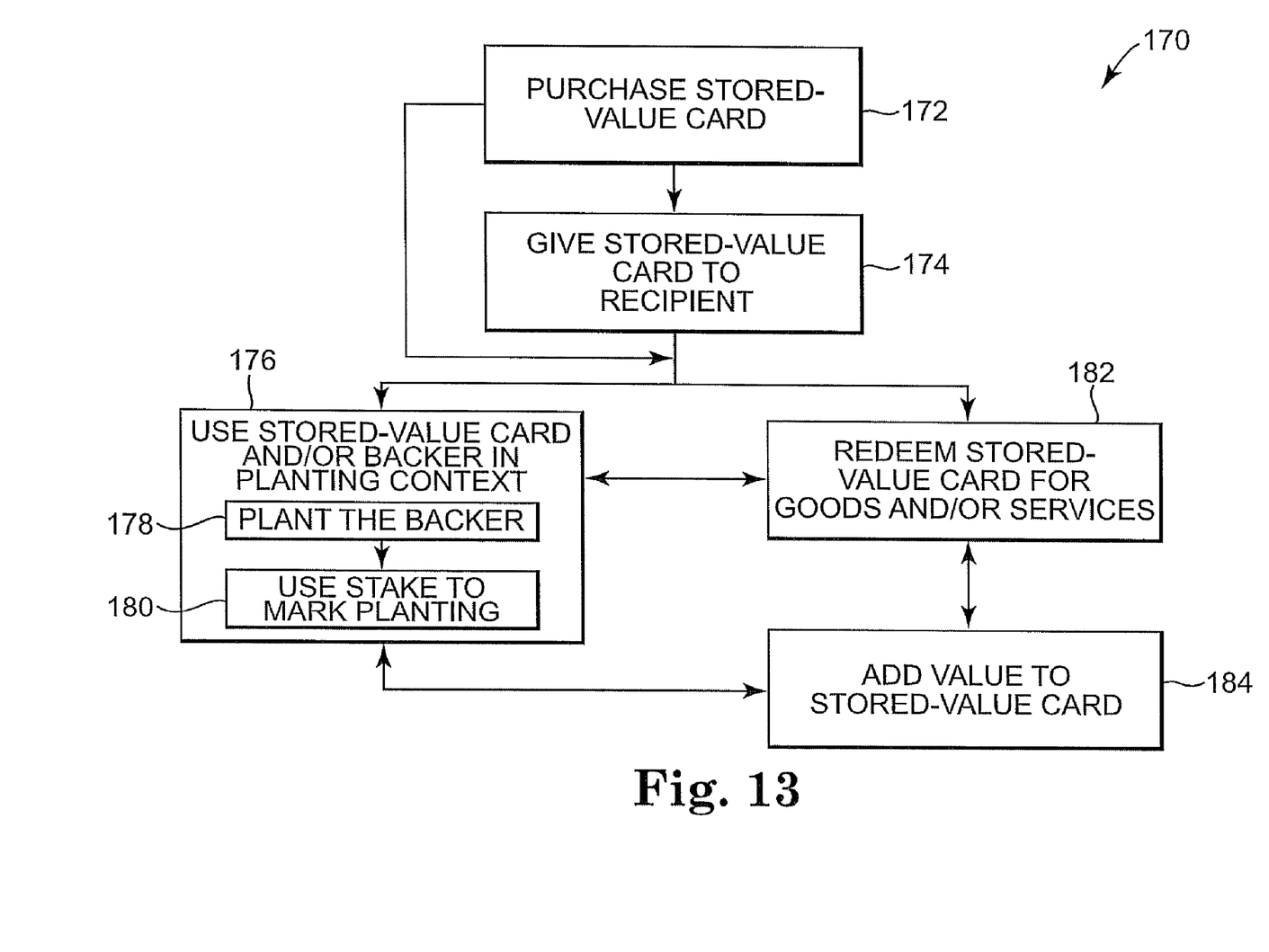
FIG. 13 is a flow chart illustrating a method of using a stored-value card assembly, according to one embodiment of the present invention.

FIG. 13 is a flow chart illustrating one embodiment of a method 170 of using stored-value card 10 (e.g., FIG. 1). At 172, a potential consumer of stored-value card 10, which is displayed in a retail store or viewed on a website, decides to and does purchase stored-value card 10 from the retail store or website. Stored-value card 10 can be displayed and purchased alone or as part of stored-value card assembly 74 (FIG. 10) along with backer 70. Upon purchasing a stored-value card 10, a retail store employee, a retail store kiosk, or other person or device scans account identifier 40 (FIGS. 3 and 10) through window 100 of backer 70 or otherwise reads or accesses account identifier 40. Upon accessing account identifier 40, the account or record linked to account identifier 40 is accessed and activated to load value onto stored-value card 10. In one embodiment, such as where stored-value card 10 is purchased at 172 via a website, actual scanning of account identifier 40 may be eliminated.

At 174, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 174.

At 176, the consumer or recipient, whoever is in current ownership or otherwise is the current bearer of stored-value card 10, removes stored-value card 10 from backer 70 and plants at least a portion of stored-value card assembly 74. For example, at 178, the current bearer of stored-value card 10 plants backer 70 as instructed by indicia 90. More specifically, the current bearer of stored-value card assembly 74 tears backer 70 into pieces such as pieces 70a and 70b as illustrated in FIG. 11, soaks backer 70, and plants backer pieces 70a and 70b within planting composition 80 as illustrated with additional reference to FIG. 11.

In one example, at 180, second portion 26 of stored-value card 10 is removed from first portion 24 and is placed within planting composition 80 as illustrated in FIG. 11 to mark where backer 70 (or at least a piece 70a or 70b thereof) was planted. Subsequently, the consumer or recipient can water and/or otherwise wait for the plurality of seeds 78 of backer 70 to sprout and grow as plants 82. In one embodiment, for example, where stored-value card 10' is substituted for stored-value card 10 as illustrated with additional reference to FIG. 8, first portion 24' of stored-value card 10' is additionally or alternatively planted in planting composition 80 to allow the plurality of seeds 50 to spout and grow similar to the one or more seeds 78.

At 182, the consumer or recipient redeems stored-value card 10, more particularly, first portion 24 of stored-value card 10 for goods and/or services from the retail store or website. At 184, the consumer or recipient of stored-value card 10 optionally adds value to first portion 24 of stored-value card 10, and more particularly, to the account or record associated with account identifier 40 included therewith, at the retail store or over the Internet (i.e. via the website). Upon using backer 70 and/or stored-value card 10 in the planting context at 176, redeeming stored-value card 10 at 182, or adding value to stored-value card 10 at 184, the consumer or recipient of stored-value card 10 subsequently can perform any of operations 176, 182, or 184 as desired. In one embodiment, the ability of the consumer or recipient to repeat redeeming stored-value card 10 at 182 is limited by whether the account or record linked with stored-value card 10 has any remaining value stored or recorded therein at the time of attempted redemption.

Although described above as occurring at a single retail store or website, in one embodiment, purchasing stored-value card 10 at 172, redeeming stored-value card 10 at 182, and adding value to stored-value card 10 at 184, can each be performed at any one of a number of stores adapted to accept stored-value card 10 or over the Internet. In one example, a number of stores are each part of a chain or are similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of an account or record associated with a stored-value card. The balance associated with the stored-value card declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, calling cards, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A financial transaction card assembly comprising: seeds of at least one type, each of the seeds being configured for planting in a planting composition; a card coupled with the seeds, the card being a single piece formed of a single material and defining a first portion and a second portion attached to and readably separable from the first portion along a pre-defined line of weakness, the first portion including an account identifier, which links the card to at least one of a financial account and a financial record and is machine readable by a point-of-sale terminal, the second portion including a pointed end and indicia identifying the at least one type of the seeds; wherein the second portion is configured for insertion into the planting composition to mark where the seeds are planted in the planting composition.

2. The financial transaction card assembly of claim 1, wherein the account identifier is a bar code.

3. The financial transaction card assembly of claim 1, wherein the first portion is configured to be bent relative to and snapped from the second portion to separate the first portion from the second portion.

4. The financial transaction card assembly of claim 1, wherein the card is biodegradable.

5. The financial transaction card assembly of claim 4, wherein the seeds are embedded within the card.

6. The financial transaction card assembly of claim 1, wherein the card is packaged with the seeds, and the second portion of the card includes indicia indicating at least one of a name of the seeds and a representation of a plant that will grow from the seeds after the seeds are planted.

7. The financial card assembly of claim 1, further comprising a backer selectively coupled with and configured to support the card.

8. The financial transaction card assembly of claim 7, wherein the backer is formed of a substantially biodegradable material having the seeds embedded therein such that when the backer is planted in the planting composition, the seeds are planted in a suitable manner to permit the seeds to grow.

9. The financial transaction card assembly of claim 8, wherein the second portion of the card includes the indicia, the indicia including at least one of a name of the seeds of the backer and a depiction of one or more plants that will result from planting the seeds of the backer.

10. The financial transaction card assembly of claim 1, wherein the substrate is a single-piece substrate.

11. The financial transaction card assembly of claim 1, wherein the first portion is adjacent and directly connected to the second portion.

12. A stored-value card assembly comprising:
one or more seeds; and
a stored-value card including:
    machine readable means for linking the stored-value card to a stored-value account or record;
    means for identifying at least one type of the one or more seeds; and
    means for connecting the means for linking the stored-value card with the means for identifying the at least one type of the one or more seeds such that the means for linking the stored-value card to the stored-value account is readily separable from the means for identifying the at least one type of the one or more seeds such that the stored-value card is a single piece formed of a single material and includes means for being divided into a first portion and a second portion, the first portion including the means for linking, and the second portion including the means for identifying.

13. The stored-value card assembly of claim 12, wherein the one or more seeds are configured to be planted in a soil, and wherein the means for identifying includes means for facilitating insertion of the means for identifying in the soil to mark where the one or more seeds are planted.

14. The stored-value card assembly of claim 12, wherein the one or more seeds are embedded in means for supporting the stored-value card, and wherein the means for supporting the stored-value card are substantially biodegradable and selectively coupled with the stored-value card.

15. The stored-value card assembly of claim 14, wherein the stored-value card is substantially biodegradable.

16. The stored-value card assembly of claim 14, wherein the means for supporting includes means for permitting access to the means for linking through the means for supporting.

17. A method of encouraging purchase and facilitating use of a stored-value product, the method comprising:
displaying the stored-value product at a retail store, the stored-value product including an account access portion connected to a stake portion, wherein the stake portion is separable from the account access portion without use of tools and includes a pointed end configured to facilitate placement of the stake portion into a planting composition, and the account access portion includes an account identifier linking the stored-value product to a stored-value account or record; and activating the stored-value product to permit deductions from the stored-value account or record; wherein displaying the stored-value product includes displaying the stored-value product coupled to a carrier, wherein at least one of the stored-value product and the carrier is substantially biodegradable and includes one or more seeds embedded therein, the account access portion and the stake portion are formed of a single-piece substrate, and the single-piece substrate defines a pre-defined line of weakness such that the single-piece substrate is configured to be snapped apart without the use of tools along the pre-defined line of weakness to separate the account access portion from the stake portion.

18. The method of claim 17, wherein the stake portion of the stored-value product includes a seed identifier indicating a type of the one or more seeds.

19. The method of claim 17, further comprising receiving the stored-value product as payment for goods or services, at least a portion of a value of the goods or services being deducted from the stored-value account or record.

20. The method of claim 17, wherein the account access portion and the stake portion are positioned adjacent and are directly connected to one another.

21. The method of claim 17, wherein the account access portion is substantially biodegradable and includes one or more seeds embedded therein.

22. The method of claim 17, wherein the stake portion is substantially rectangular except for the pointed end.

23. The method of claim 17, the method further comprising providing instructions to place the at least one of the stored-value product and the carrier that includes the one or more seeds embedded therein within a planting composition to plant the one or more seeds.

\* \* \* \* \*